3,567,790
PROCESS FOR PRODUCING CYCLODODECENE
Migiho Morita, Yoshisuke Iwai, Jo Itakura, and Hiroo Ito, Nagoya, Japan, assignors to Toagosei Chemical Industry Co., Ltd., and Akira Misono, both of Tokyo, Japan
No Drawing. Filed Dec. 23, 1969, Ser. No. 887,786
Claims priority, application Japan, May 26, 1969, 44/40,765
Int. Cl. C07c 5/02
U.S. Cl. 260—666  5 Claims

ABSTRACT OF THE DISCLOSURE

An improved process for producing cyclododecene by selectively hydrogenating 1,5,9-cyclododecatriene with a hydrogen gas using as a catalyst a complex compound comprising a cobalt carbonyl and a tertiary phosphine, in which the hydrogenation is effected in the presence of a small amount of carbon monoxide thereby preventing the catalyst from degradation to obtain the desired product with advantages.

---

This invention relates to an improvement in a process for producing cyclododecene (hereinafter abbreviated to CDE) by selectively hydrogenating 1,5,9-cyclodecatriene (hereinafter abbreviated to CDT) using a cobalt carbonyl-phosphine complex as a catalyst.

The object of the present invention is to provide an improved process for producing extremely high purity CDE under such conditions that CDT can be converted substantially completely by adoption of a means for inhibiting the catalyst from degeneration and decomposition taking place during the reaction, thereby utilizing the activity of the catalyst to the maximum extent while maintaining the amount thereof to the minimum degree.

Heretofore, a variety of studies have been effected on selective hydrogenation reactions for obtaining mono-olefins by partially hydrogenating olefins having 2 or more carbon-carbon bonds in one molecule, and various catalyst systems and reaction conditions have been reported. As to processes for producing CDE from CDT obtainable easily by cyclization under trimerization of butadiene also, there have been reported the cases where catalysts of Ni, Co or Pd systems were used. Among these, a process using cobalt carbonyl-phosphine complexes as catalysts, as disclosed in, for example, Bull. Chem. Soc. Japan, 40, 2718 (1967), is an extremely excellent process and, if suitable reaction conditions are selected, can give substantially quantitatively CDE of a markedly high purity (e.g. 98%). At present, the obtainment of such a high purity CDE can by no means be attainable according to any other processes. Moreover, the fact that such a high purity CDE is regarded as being extremely important in the field of chemical industry is obvious without citing the explanation made in U.S. Pat. No. 3,308,177.

However, if the process for producing CDE using cobalt carbonyl-phosphine complexes as catalysts is intended to be directly utilized on commercial scale, there are encountered several problems. That is, according to the results of tests carried out by the present inventors, it has been found that the complexes of this kind are susceptible under hydrogenation reaction conditions of CDT to the influence of slight amounts of oxygen and water migrated into the reaction system, and that the catalysts themselves are insufficient in stability at elevated temperatures. Accordingly, in order to attain a high conversion of CDT and a high selectively of CDE, it is necessary that attention be paid to the selection in kind of the catalyst and the amount of the catalyst employed be made large. For example, in case the hydrogenation of CDT has been effected by use of the catalyst in an amount less than a certain limit, a part of the catalyst is degenerated to bring about such undesirable results that the proportion of cyclododecane (hereinafter abbreviated to CDA), which is a complete hydrogenation product, becomes great or, in some cases, the reaction terminates leaving a considerable amount of unreacted CDT. Such results invite, when the process is intended to be carried out on commercial scale, the increase in cost of the catalysts, and thus the above-mentioned process is extremely disadvantageous from the economical standpoint.

On the other hand, a process in which a partial pressure of carbon monoxide is applied in order to prevent the catalyst from decomposition and degeneration is also disclosed in the aforesaid literature. That is, the literature describes the case where a triphenylphosphine complex of cobalt carbonyl was used and a CO partial pressure of 5 kg./cm.$^2$ was applied. In this case, however, considerable amounts of oxocompounds were by-produced, and the writer of said literature states that such by-production naturally takes place.

With an aim to overcome the above-mentioned drawbacks, the present inventors made repeated studies to find that in the selective production of CDE by hydrogenating CDT using a cobalt carbonyl-phosphine complex as a catalyst at an elevated temperature and under hydrogen pressure in the presence or absence of an inert solvent, a complex formed from a cobalt carbonyl and a tertiary phosphine represented by the formula

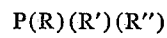

wherein R, R' and R'' are same or different alkyl or cycloalkyl groups, was used as the catalyst and a small amount of carbon monoxide was made present in the reaction system, whereby satisfactory results can be obtained even if the catalyst was used in an amount far smaller than the minimum amount required heretofore for the attainment of satisfactory CDT conversion and satisfactory CDE selectivity. On the basis of the above-mentioned finding, the present inventors have accomplished the present invention.

In practice, in accordance with the process of the present invention, it is possible, by merely making present in the reaction system carbon monoxide in such an amount as, for example, about 1–2 kg./cm.$^2$ in terms of partial pressure, to obtain the results of a CDT conversion of about 100%, a CDE selectivity of 96–99% and a CDA selectivity of less than 3%, even if the amount of the cobalt carbonyl-phosphine complex employed is reduced to less than ½ the amount required in the conventional process. Moreover, in the above case, the amount of reacted carbon monoxide is extremely slight to give such favorable result that the selectivity of so-called oxo-reaction product is not more than about 1%.

The catalysts employed in the present process are cobalt complexes containing as ligands in the molecule at least one CO and at least one of the aforesaid tertiary phosphines. These may be added to the reaction system, either in an isolated form or in the form of reaction liquids obtained in the synthesis thereof.

The catalysts to be used in the present invention are complexes comprising cobalt carbonyls and tertiary phosphines represented by the formula P(R)(R')(R''), wherein R, R' and R'' are same or different alkyl or cycloalkyl groups. Examples of the tertiary phosphines represented by said formula are as set forth below (1) In the case where R, R' and R'' in the above formula are same:

$P(CH_3)_3$, $P(C_2H_5)_3$, $P(n-C_3H_7)_3$, $P(i-C_3H_7)_3$,
$P(n-C_4H_9)_3$, $P(i-C_4H_9)_3$, $P(n-C_5H_{11})_3$, $P(i-C_5H_{11})_3$,

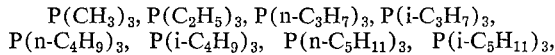

$P(C_6H_{13})_3$, $P(C_7H_{15})_3$, $P(C_8H_{17})_3$, etc.

(2) In the case where R, R' and R'' in the above formula are different:

$P(CH_3)_2(C_2H_5)$, $P(CH_3)_2(n-C_4H_9)$, $P(C_2H_5)_2(CH_3)$, $P(C_2H_5)_2(n-C_3H_7)$, $P(C_2H_5)_2(i-C_5H_{11})$,
$P(C_2H_5)_2(n-C_4H_9)$, $P(C_3H_7)_2(n-C_4H_9)$,

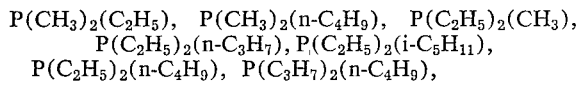

etc., or
$P(CH_3)(C_2H_5)(n-C_5H_{11})$, $P(C_2H_5)(i-C_3H_7)(i-C_4H_9)$,
$P(C_2H_5)(n-C_4H_9)(n-C_{12}H_{25})$,
$P(n-C_3H_7)(n-C_6H_{13})(n-C_9H_{19})$, etc.

Examples of the complexes obtained from such tertiary phosphines and cobalt carbonyls are those represented by the formulas $$[Co(CO)_3\{P(R)(R')(R'')\}_2][Co(CO)_4]$$

and $$[Co(CO)_3 \cdot P(R)(R')(R'')]_2$$

Concretely, complexes of the formulas shown below are frequently used.

$$[Co(CO)_3P(C_2H_5)_3]_2$$
$$[Co(CO)_3P(n-C_4H_9)_3]_2$$

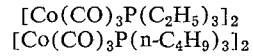

$$[Co(CO)_3\{P(C_2H_5)_3\}_2][Co(CO)_4]$$
$$[Co(CO)_3\{P(n-C_4H_9)_3\}_2][Ca(CO)_4]$$

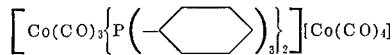

In using such complexes without isolating from synthesis liquids thereof, the ratios of cobalt atoms and phosphine atoms (Co/P) contained in the synthesis liquids are not always required strictly to be 1, and sufficient effects can be expected so far as the Co/P ratio is within the range of 0.5–2.

Examples of solvents usable in carrying out the partial hydrogenation in the presence of solvents include aromatic hydrocarbons such as benzene, toluene, xylene, ethylbenzene, etc.; straight chain and branched-chain saturated aliphatic hydrocarbons such as pentane, hexane, heptane, octane, etc.; alicyclic hydrocarbons such as cyclopentane, methylcyclopentane, cyclohexane, methylcyclohexane, cyclooctane. cyclododecene, etc.; ethers such as diethyl ether, dipropyl ether, dibutyl ether, tetrahydrofuran, tetrahydropyran, etc.; and alcohols such as ethanol, propanol, butanol, etc.

The partial hydrogenation may be effected, in the absence of solvent, either in the cyclododecene formed by the reaction, or in mixed systems comprising said cyclododecene and various solvents mentioned above.

The amount of the solvent, when it is used, is substantially optional, but is ordinarily 1 to 2,000% by volume based on the amount of the starting CDT.

The reaction temperature somewhat varies depending on the kind of the complex employed, but is ordinarily in the range of 100°–180° C. Particularly, the adoption of a temperature range of 120°–180° C. is advantageous in most cases in connection with the reaction rate and the like.

The hydrogen partial pressure employed in the present invention is variable within a wide range and may be less than 1 kg./cm.$^2$, but is ordinarily in the range of 2 to 300 kg./cm.$^2$, preferably 10 to 150 kg./cm.$^2$.

As to the introduction of carbon monoxide, there is a preferable range of partial pressure of carbon monoxide in the reaction system, and the maintenance of said preferable range may be said to be a key to the satisfactory progress of the reaction. That is, the amount of carbon monoxide present in the reaction system should be made more than one mole per gram-atom of the cobalt atom in the catalyst, and the partial pressure thereof should be made less than 4 kg./cm.$^2$, preferably in the range of 0.5–3 kg./cm.$^2$. Of course, this preferable partial pressure range more or less varies depending on the kind of the catalyst employed and other reaction conditions but, in any case, is less than 4 kg./cm.$^2$. When carbon monoxide of such a low partial pressure is made present in the reaction system, the catalyst activity is stabilized and the catalyst efficiency is markedly enhanced, so that the amount of the cobalt complex catalyst employed can be reduced to, for example less than ½ as compared with the conventional case where carbon monoxide has not been used.

Further, in the above-mentioned case, it has surprisingly been found that under suitable reaction conditions, most of the carbon monoxide added remains in the system without causing any reaction with CDT and the like starting materials, and thus contributes only to the stabilization of the catalyst.

Accordingly, the inference that a suitable amount of carbon monoxide present in the system would be scarcely connected with the amount of the starting CDT introduced into the system, has actually been substantiated by the present inventors.

However, if such a high carbon monoxide partial pressure as exceeding 4 kg./cm.$^2$, for example, is applied to the reaction system, the hydrogenation reaction rate greatly lowers, and therefore no substantial reaction of CDT takes place at such a reaction temperature as has been suitable in the case where a carbon monoxide partial pressure within the aforesaid preferable range has been adopted. In order to react CDT in the above case, therefore, the reaction temperature should be made considerably high. Under such conditions, however, the catalyst is liable to be degenerated and decomposed and the by-production of oxocompounds takes place, so that no desirable partial hydrogenation reaction can be progressed any more.

United States Pat. No. 3,308,177 discloses a method for producing CDE by the hydrogenation of CDT, in which the reaction is carried out by use of a cobalt compound as a catalyst in the presence of carbon monoxide in an amount of 0.4–2.0 moles per mole of CDT fed to the reactor. According to the said method, however, considerable amounts of oxocompounds are formed in addition to CDE, as is clear from the specification. This is because said method employs such a high carbon monoxide partial pressure as has been recognized unsuitable in the tests carried out by the present inventors, and adopts such conditions that an oxo-reaction substantially takes place together with the hydrogenation reaction. In the method of said United States patent, there is adopted, under conditions for the production of CDE, a carbon monoxide partial pressure of 13.6–34.0 kg./cm.$^2$ (more than 0.45 mole of carbon monoxide per mole of CDT) and, in this case, considerable amounts of oxocompounds are necessarily by-produced, as is clear from the examples. Further, said United States patent discloses that at a lower partial pressure, e.g. 6.8 kg./cm.$^2$, only a part of CDT reacted.

The present invention is such an extremely industrially-valuable process that the carbon monoxide partial pressure is regulated to such a markedly low value as less than 4 kg./cm.$^2$ (preferably less than 0.3 mole of carbon monoxide per mole of the fed CDT) as mentioned previously, whereby extremely high purity CDE can be produced with a high selectivity, using the catalyst in a markedly small amount and utilizing the activity thereof to the maximum extent.

The present process can be effected in any of a batchwise manner using an autoclave or the like or a continuous manner.

The content of the present invention is illustrated below with reference to examples and comparative examples.

EXAMPLE 1

A solution of 125 g. (0.77 mole) of trans,trans,cis-CDT (hereinafter abbreviated to ttc-CDT) in 125 g. of benzene was charged with 0.61 g. (0.88×10$^{-3}$ mole) of [Co(CO)$_3$P(n-C$_4$H$_9$)$_3$]$_2$ as a catalyst. This solution was transferred in a nitrogen atmosphere to a 1,000 cc. autoclave lined with glass, and the autoclave was closed. After flushing the interior of the reactor with high purity hydrogen, there were introduced into the reactor at room temperature carbon monoxide to a pressure of 1.18 kg./cm.$^2$ and then hydrogen to a pressure of 20 kg./cm.$^2$. The stirring of the liquid inside the reactor was effected by means of an electromagnetic stirrer, and the heating thereof was effected by means of an external electric heater. When the pressure initiated to lower, hydrogen was further introduced to make 40 kg./cm.$^2$. The temperature at that time was 130° C. but became the maximum of 148° C. due to generation of heat, and the system was maintained at about 145° C. When the hydrogen pressure lowered to 30 kg./cm.$^2$ due to gas absorption, hydrogen was further added to make 40 kg./cm.$^2$. After 160 minutes from initiation of the reaction, the absorption of hydrogen ceased. The total amount of hydrogen absorbed was 77 kg./cm.$^2$. Subsequently, the reaction liquid was taken out and was analyzed according to gas chromatography to find that the conversion of CDT was 100%, the selectivities of trans-CDE, cis-CDE and CDA were 66.5%, 32.1% and 1.4%, respectively, and the amount of oxocompound formed was trace. The reaction liquid was allowed to stand in air to decompose a major proportion of the catalyst which was then removed as a precipitate. Thereafter, the whole liquid was subjected to distillation to obtain 126 g. of a fraction (B.P. 97.5° C./10 mm. Hg) containing 98% of CDE and 0.5 g. of a residue.

EXAMPLE 2

A mixture comprising 125 g. (0.77 mole) of ttc-CDT, 125 g. of benzene and 1.18 g. (1.71×10$^{-3}$ mole) of [Co(CO)$_3$P(n-C$_4$H$_9$)$_3$]$_2$ was charged into a reactor. Into the reactor were introduced, in the same manner as in Example 1, carbon monoxide to a pressure of 2.16 kg./cm.$^2$ and then hydrogen to a pressure of 20 kg./cm.$^2$. After stirring and heating, the mixture was reacted for 320 minutes under such conditions as a hydrogen pressure of 30–40 kg./cm.$^2$ and a reaction temperature of 135°–160° C. The reaction liquid obtained was analyzed according to gas chromatography to find that the conversion of CDT was 100% and the selectivities of the products CDE, cyclododecadiene (CDD) and oxocompound were 99.0% 0.5% and 0.5%, respectively. The whole reaction liquid was subjected to distillation to obtain 127 g. of 99% purity CDE and 0.75 g. of a high boiling substance as a residue.

EXAMPLE 3

In the same manner as in Example 1, a mixture comprising 125 g. (0.77 mole) of ttc-CDT, 125 g. of ethanol and 1.10 g. (1.6×10$^{-3}$ mole) of [Co(CO)$_3$P(n-C$_4$H$_9$)$_3$]$_2$ was charged into a reactor, and there were introduced into the reactor carbon monoxide to a pressure of 1.18 kg./cm.$^2$ and then hydrogen to a pressure of 80 kg./cm.$^2$. Subsequently, the mixture was reacted at a reaction temperature of 125°–140° C. under a reaction of 100 kg./cm.$^2$ until the hydrogen absorption had ceased. As the result, the conversion of CDT was 100% and the selectivities of CDE and CDA were 99.5% and 0.5%, respectively.

EXAMPLE 4

160 g. (0.99 mole) of CDT (a 88:12 mixture of trans,trans,trans-CDT and trans,trans,cis-CDT), 103 g. of cyclohexane and 10 g. (0.0495 mole) of tri-n-butyl phosphine were mixed together. To the mixture was added 80 ml. of a cyclohexane solution containing 4.8 g. (0.0140 mole) of dicobalt octacarbonyl. This liquid was transferred in an argon atmosphere to a 1,000 cc. autoclave (made of SUS–27; horizontally shaking-stirring type), and there were introduced into the autoclave carbon monoxide to a pressure of 1.18 kg./cm.$^2$ and then hydrogen to a pressure of 20 kg./cm.$^2$. This liquid was reacted at a temperature of 150° C. under a pressure of 20–40 kg./cm.$^2$ for 120 minutes, whereby the lowering of pressure ceased. The reaction liquid was analyzed according to ordinary procedure to find that the conversion of CDT was 100%, the selectivities of CDA and CDE were 2.8% and 97.2%, respectively, and the amount of oxocompound formed was trace.

EXAMPLE 5

In a nitrogen atmosphere, a 100 cc. autoclave lined with glass was charged with a mixture comprising 12 g. (0.07 mole) of CDT, 3 g. of benzene and 0.1 g. (0.139×10$^{-3}$ mole) of

[Co(CO)$_3$\{P(n-C$_4$H$_9$)$_3$\}$_2$][Co(CO)$_4$]

Into the autoclave were introduced carbon monoxide to a pressure of 0.24 kg./cm.$^2$ and then hydrogen to a pressure of 20 kg./cm.$^2$. After heating and stirring, the mixture was reacted at a temperature of 140°–150° C. under a pressure of 30–40 kg./cm.$^2$ for a period of 200 minutes. As the result, the conversion of CDT was 100%, the selectivities of CDA and CDE were 2.7% and 97.3%, respectively, and the amount of oxocompound formed was trace.

EXAMPLE 6

Example 1 was repeated, except that 0.73 g.

(0.86×10$^{-3}$ mole)

of

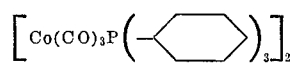

was used as the catalyst in place of the

[Co(CO)$_3$P(n-C$_4$H$_9$)$_3$]$_2$

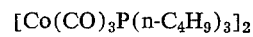

to prepare a mixture. The mixture was reacted at a temperated of 140° C. for 130 minutes, and then the reaction liquid was taken out and was analyzed. As the result, the conversion of CDT was 100% and the selectivity of CDE was 98.1%.

COMPARATIVE EXAMPLE 1

Entirely the same feed conditions as in Example 1 were adopted, except that no carbon monoxide was added, to prepare a mixture. The mixture was reacted, using 0.65 g. of the same catalyst as in Example 1, at a temperature of 120°–145° C. under a pressure of 30–40 kg./cm.$^2$ for 80 minutes, whereby the hydrogen absorption ceased. The product was subjected to analysis to find that 23% of the fed CDT had been left unreacted.

COMPARATIVE EXAMPLE 2

Example 2 was repeated, except that no carbon monoxide was added and the amount of the catalyst was made 1.24 g. (1.79×10⁻³ mole). The reaction was effected at a temperature of 120°–145° C. under a pressure of 30–40 kg./cm.², whereby the reaction terminated after 70 minutes. The product was subjected to analysis to find that the conversion of CDT was 100% and the selectivities of CDA and CDE were 8.8% and 91.2%, respectively.

In the case where the amount of the catalyst was made 4.80 g., the selectivity of CDE become 97.6%.

COMPARATIVE EXAMPLE 3

Example 2 was repeated, except that the carbon monoxide partial pressure was made 7.5 kg./cm.². In this case, the temperature was initially maintained at 150° C., whereby the pressure scarcely lowered. After carrying out the reaction for 300 minutes at a temperature of 160°–170° C. under a pressure of 40–50 kg./cm.², the reaction was discontinued, though there had been still observed gradual gas absorption. The reaction mixture was analyzed according to gas chromatography to find that it was composed of, in addition to the solvent benzene, 61% (by weight) of CDE, 17% of cyclododecadienes, 12% of CDT and about 10% of oxocompound. Thereafter, the reaction mixture was subjected to distillation, whereby 13.2 g. of a high boiling susbtance (probably oxocompound) was obtained as a residue.

COMPARATIVE EXAMPLE 4

Example 2 was repeated, except that 1.16 g.

(1.43×10⁻³ mole)

of

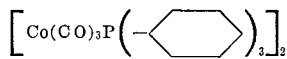

was used in place of the [Co(CO)₃P(n-C₄H₉)₃]₂. After carrying out the reaction at a temperature of 155°–165° C. for 200 minutes, the reaction liquid was analyzed to find that the conversion of CDT was 100%, the selectivities of CDE and CDA were 90.5% and 4.7%, respectively, and the amount of oxocompound formed was about 5.7%.

As is clear from the above, complexes of aromatic tertiary phosphines are not suitable as catalysts.

The moles of carbon monoxide per cobalt atom in the catalyst and the moles of carbon monoxide per mole of the CDT fed in the foregoing examples and comparative examples are shown in Table 1.

TABLE 1

| | Example No. | | | | | | Comparative 1 | Comparative 2 | Comparative 3 |
|---|---|---|---|---|---|---|---|---|---|
| | 1 | 2 | 3 | 4 | 5 | 6 | | | |
| CO/Co(mmol./mg. atm.) | 24 | 21 | 12 | 1.4 | 6.5 | 23 | 0 | 0 | 73 |
| CO/CDT(mmol./mmol.) | 0.051 | 0.094 | 0.051 | 0.041 | 0.024 | 0.051 | 0 | 0 | 0.33 |

While the present invention has been described with respect to specific examples, it is to be understood that these examples are for purposes of illustration only and that the invention is not limited thereto, since many variations and modifications can be practiced without departing from its spirit and scope.

What is claimed is:

1. An improved process for producing cyclododecene by selectively hydrogenating 1,5,9-cyclododecatriene under a hydrogen pressure in the presence of a catalyst, characterized in that the reaction is effected in a liquid phase by use of as a catalyst a complex comprising a cobalt carbonyl and a tertiary phosphine represented by the formula $$P(R)(R')(R'')$$

wherein R, R' and R'' are same or different alkyl or cycloalkyl groups, and in the presence of carbon monoxide in an amount of at least one mole per gram-atom of the cobalt in said catalyst and of up to 4 kg./cm.² in terms of partial pressure.

2. A process according to claim 1, wherein the reaction is effected while maintaining within the range of 0.5 to 2 the ratio of the cobalt atom to the phosphorus atom contained in the reaction liquid.

3. A process according to claim 1, wherein the reaction is effected at a temperature in the range of 100° to 250° C.

4. A process according to claim 1, wherein the reaction is effected while maintaining the partial pressure of the carbon monoxide at 0.5 to 3 kg./cm.².

5. A process according to claim 1, wherein the carbon monoxide is used in an amount of up to 0.3 mole per mole of the fed cyclododecatriene.

References Cited

UNITED STATES PATENTS 3,308,177   3/1967   Atkins _____ 260—666A

OTHER REFERENCES

Akira Misono et al., Bull. Soc. Chem., Japan, 40 2718 (1967).

DELBERT E. GANTZ, Primary Examiner

V. O'KEEFE, Assistant Examiner